(12) United States Patent
Feichtinger

(10) Patent No.: US 6,637,118 B2
(45) Date of Patent: Oct. 28, 2003

(54) ROTARY ENCODER

(75) Inventor: Kurt Feichtinger, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/071,729

(22) Filed: Feb. 8, 2002

(65) Prior Publication Data
US 2002/0108259 A1 Aug. 15, 2002

(30) Foreign Application Priority Data

Feb. 9, 2001 (DE) ......................... 101 06 012

(51) Int. Cl.7 .............................................. G01B 21/00
(52) U.S. Cl. ........................................ 33/1 PT; 33/706
(58) Field of Search ........................... 33/1 PT, 706, 33/707, 708, 710; 73/490

(56) References Cited

U.S. PATENT DOCUMENTS

| | | | | |
|---|---|---|---|---|
| 4,259,904 A | * | 4/1981 | Metje | 101/415.1 |
| 4,972,599 A | * | 11/1990 | Ernst | 33/706 |
| 5,979,238 A | | 11/1999 | Boege et al. | |
| 6,098,295 A | * | 8/2000 | Feichtinger | 33/1 PT |

FOREIGN PATENT DOCUMENTS

DE 4331668 3/1995

* cited by examiner

Primary Examiner—Christopher W. Fulton
(74) Attorney, Agent, or Firm—Sidley Austin Brown & Wood, LLP

(57) ABSTRACT

An angle encoder including a carrier member, a measurement tape securable on the bearing surface circumference of the carrier member by being clamped thereto and having its opposite ends engaging opposite stop surfaces provided on the bearing surface in a mounted position of the measurement tape, and an adjustment element for adjusting a position of at least one of the stop surface so that a distance between the two stop surfaces and thereby a length of the bearing surface circumference correspond to a length of the measurement tape.

7 Claims, 3 Drawing Sheets

ROTARY ENCODER

BACKGROUND OF THE INVENTION

1. Field of the Invention

The present invention relates to a rotary or angle encoder including a carrier member, and a measurement tape securable on the bearing surface of the carrier member by being clamped thereto, with the length of the measurement tape and the circumference of the bearing surface being so conformed to each other that the measurement tape lays on the bearing surface backlash-free in its mounted condition after having been snap-fitted on the bearing-surface.

2. Description of the Prior Art

An angle encoder of the type described above is described in German Patent DE 43 31 668 C2. A measurement tape is secured on the concave, curved inner wall of a carrier member. The length of the measurement tape and the circumference of the inner wall are so conformed to each other that the measurement tape lays backlash-free on the inner wall after being snap-lifted thereon.

However, in practice, it is relatively difficult to realize this conformity. If the measurement tape is too short, it does not lay over the entire length on the inner wall. If the measurement tape is too long, it lays, after being snap-fitted, over its entire length backlash-free on the inner wall. However, the press-on force, with which the measurement tape lays on the inner wall after being snap-fitted, is too large, so that, because of rope friction, the measurement tape cannot freely expand, and a non-uniform pressure profile is observed over the entire length of the measurement tape. The pressure profile causes a partial length change of the measurement tape and, thus, leads to measurement errors.

Accordingly, an object of the invention is to provide an angle encoder in which the measurement tape is secured by being snap-fitted and the circumference of the inner wall and the length of the measurement tape can be easily conform to each other.

SUMMARY OF THE INVENTION

This and other objects of the present invention, which will become apparent hereinafter, are achieved by providing, on the bearing surface of the inner wall, two, spaced from each other, stop surfaces, which are engaged, in the mounted condition of the measurement tape, by opposite ends of the tape, and by providing an adjustment element for adjusting a position of at least one stop surface so that a distance between the two stop surfaces and thereby a length of the bearing surface circumference correspond to a length of the measurement tape. Thereby the measurement tape lays on the bearing surface circumference, in its mounted conditions backlash-free after having been snap-fitted.

These measurers permits to conform the length of the circumference of the inner wall, on which the measurement tape lays, to the length of the measurement tape, so that the press-on force, which is applied by the measurement tape to the inner wall, can be easily adjusted and optimized.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
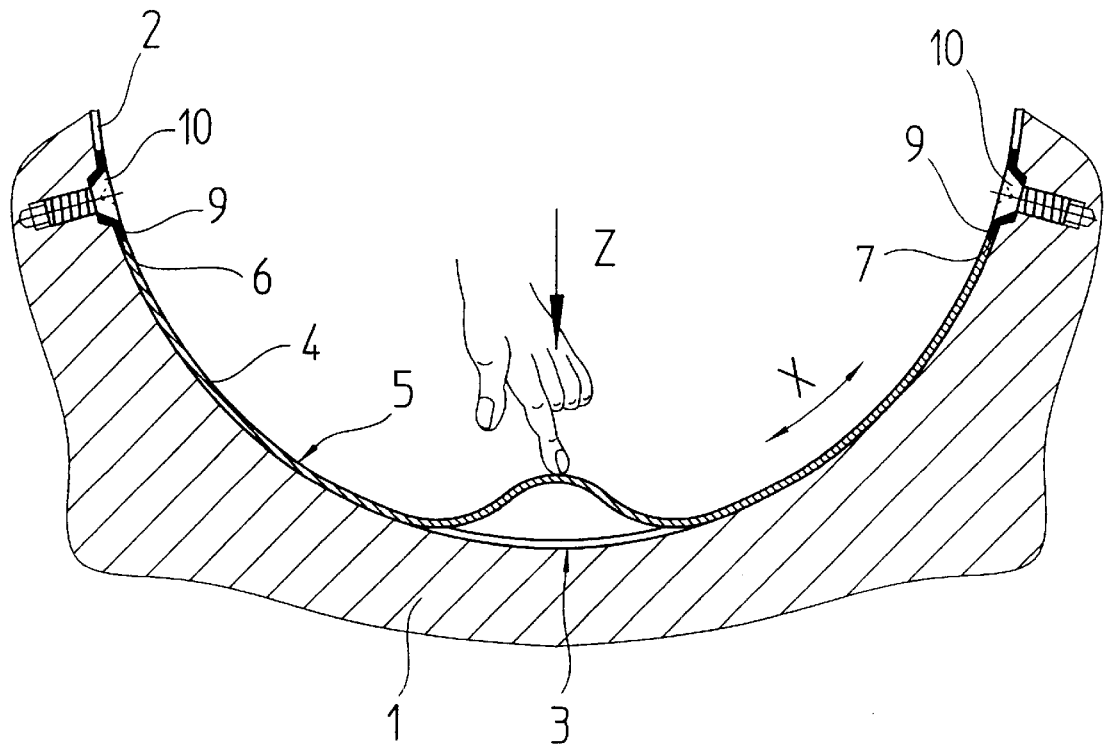
FIG. 1 shows a longitudinal cross-sectional view of a position of an angle encoder according to the present invention during mounting of the measurement tape.

An angle encoder according to the present invention, a portion of which is shown in FIG. 1, has a carrier member 1 which rotates or is deflected in the measurement direction X.

A groove 2 is formed in the concave curved inner wall of the carrier member 1. The bottom of the groove 2 function as a stop surface 3 for a measurement tape 4 which is elastically flexible in direction Z, i.e., transverse to the measurement direction X. The measurement tape 4 is advantageously formed as a steel tape and is provided with a graduation 5 (shown in FIG. 3). The graduation is formed as a photoelectrically scannable incremental graduation, however, it can also be formed for being scanned in a coded form and/or based on other physical principles, e.g., magnetic, capacitive, or inductive.

For mounting the measurement tape 4 on the carrier member 1, there are provided two stop surfaces 6 and 7 the distance between which in the measurement direction somewhat corresponds to the length of the measurement tape 4. During mounting of the measurement tape 4, its ends are brought into contact with the stop surfaces 6 and 7, and the measurement tape 4 is pinned between the stop surfaces 6 and 7. The distance between the stop surfaces 6 and 7 and, thereby, the circumference of the bearing surface 3 conform to the length of the measurement tape 4, so that the measurement tape is snap-fitted in accordance with Knackfrosch-effect and finally expands.

Figure 2:
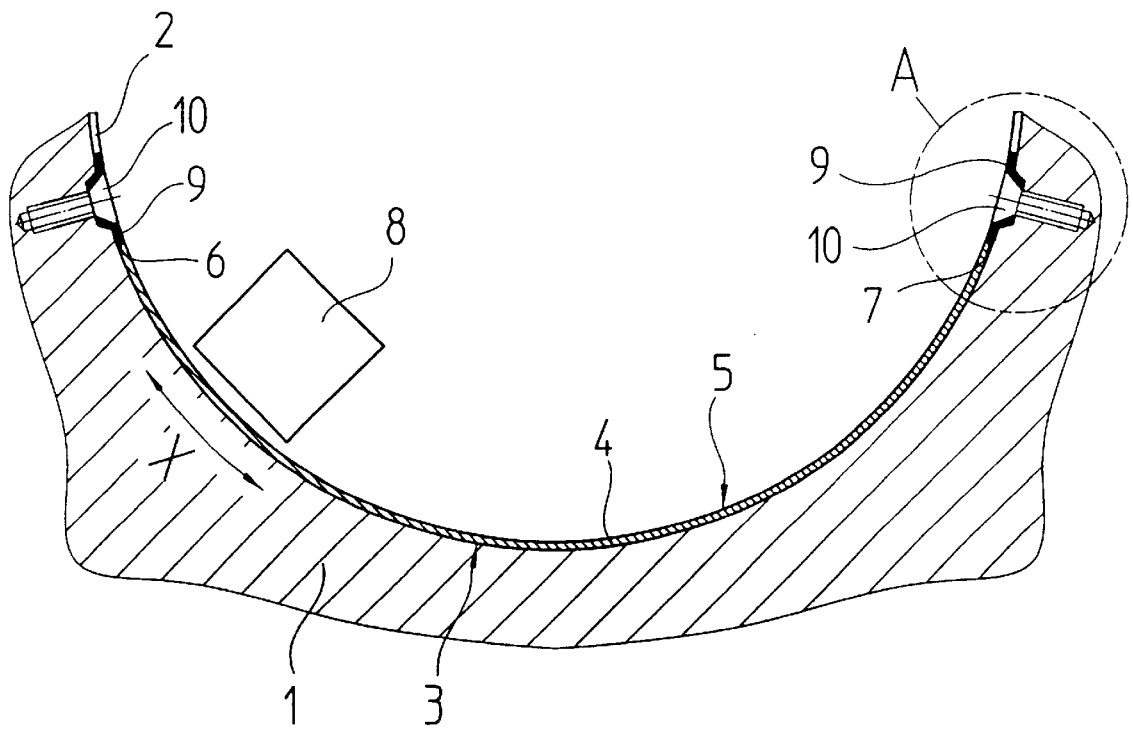
FIG. 2 shows a longitudinal cross-sectional view of a position of an angle encoder according to the present invention in the operational position thereof.
Figure 3:
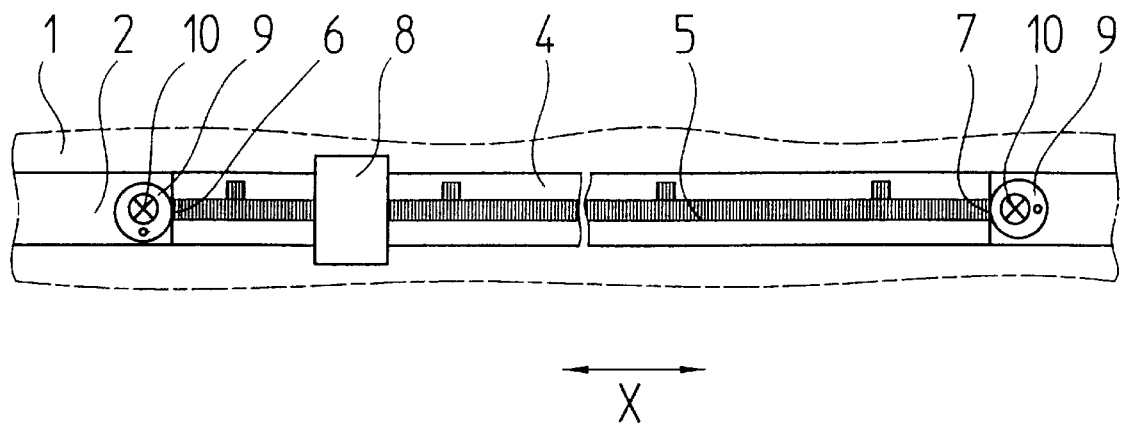
FIG. 3 shows a plan view of the portion of the angle encoder shown in FIG. 2.
Figure 4:
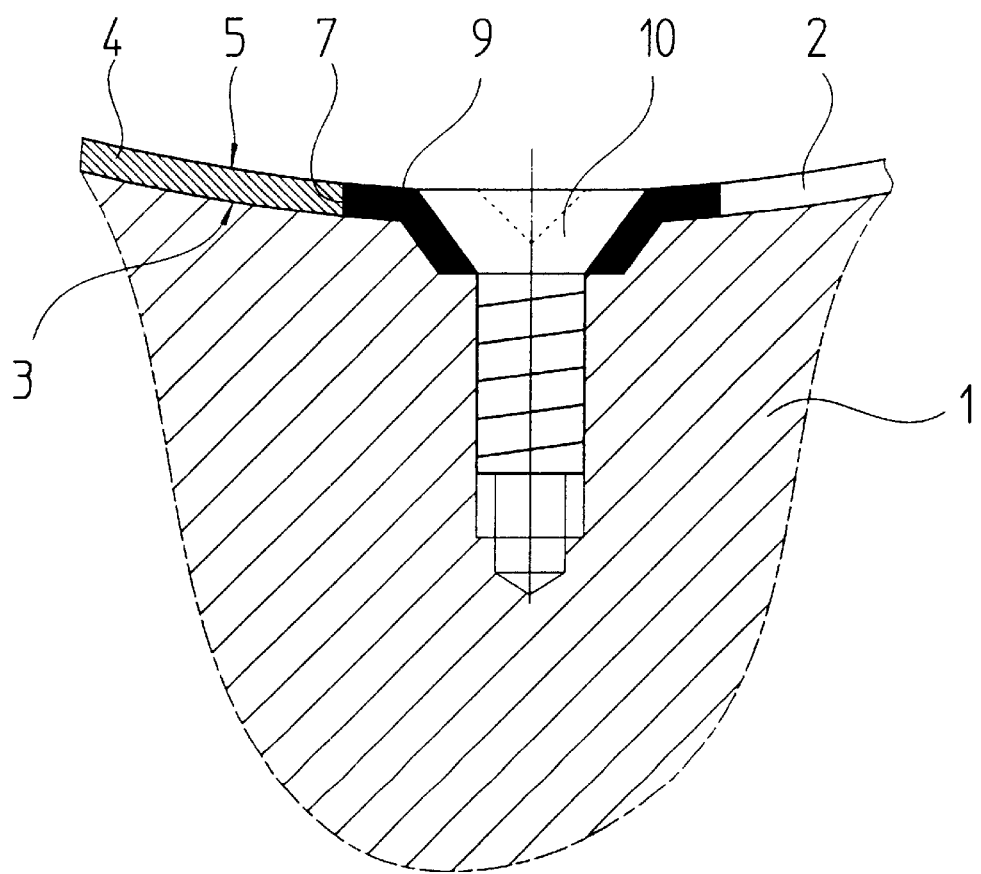
FIG. 4 shows a view of the region A in FIG. 2 at an increased scale.

FIGS. 2 and 3 show a mounted measurement tape 4 which is scanned during the measurement operation by a scanning device 8 which generates position-dependent scanning signals.

Figure 5:
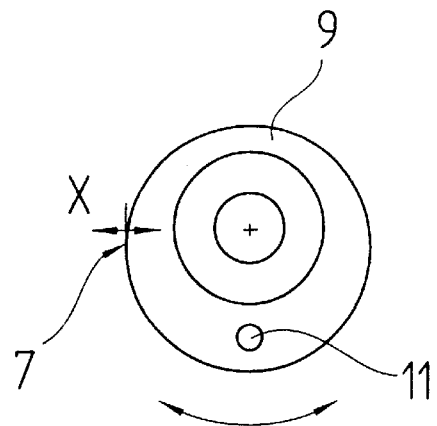
FIG. 5 shows a plan view of the adjustment element.

In order for the measurement tape 4 to be held on the bearing surface 3 between the stop surfaces 6 and 7 free of foreign bodies and backlash-free as a result of its internal tension, the distance between the stop surfaces 6 and 7 is adjustable. The adjustment is effected by changing the position of at least one of the stop surfaces 6 and 7 in the measurement direction X. The adjustment element is formed as an eccentrically supported, rotatable disc 9. The disc 9 is rotated in the groove 2 about a screw 10, whereby the effective for the measurement tape 4, stop surface 6, 7 is displaced in the longitudinal direction of the measurement tape 4, i.e., in the measurement direction X, as shown in FIG. 5 at an increased scale, by way of example, with reference to the stop surface 7. The stop surface 7 is formed by a circumferential surface of the disc 9. For its rotation, the disc 9 has engagement means, e.g., in form of a side bore 11, or a side fluting, or a side elevation. In a set rotational position, the disc 9 is prevented from rotation by the screw 10 being screwed in, and becomes undisplaceable fixed on the carrier member 1.

To simplify position retention, both end-side stop surfaces of the measurement tape 4 are identically formed and are, thus, both adjustable.

It is particularly advantageous when the depth of the groove 2 at least somewhat corresponds to the thickness of the measurement tape 4, and both the screw 10 and the disc 9 do not project above the measurement tape 4 and, thus, above the groove 2. As a result, the scanning device 8 can be displaced outwardly above this region.

Figure 6:
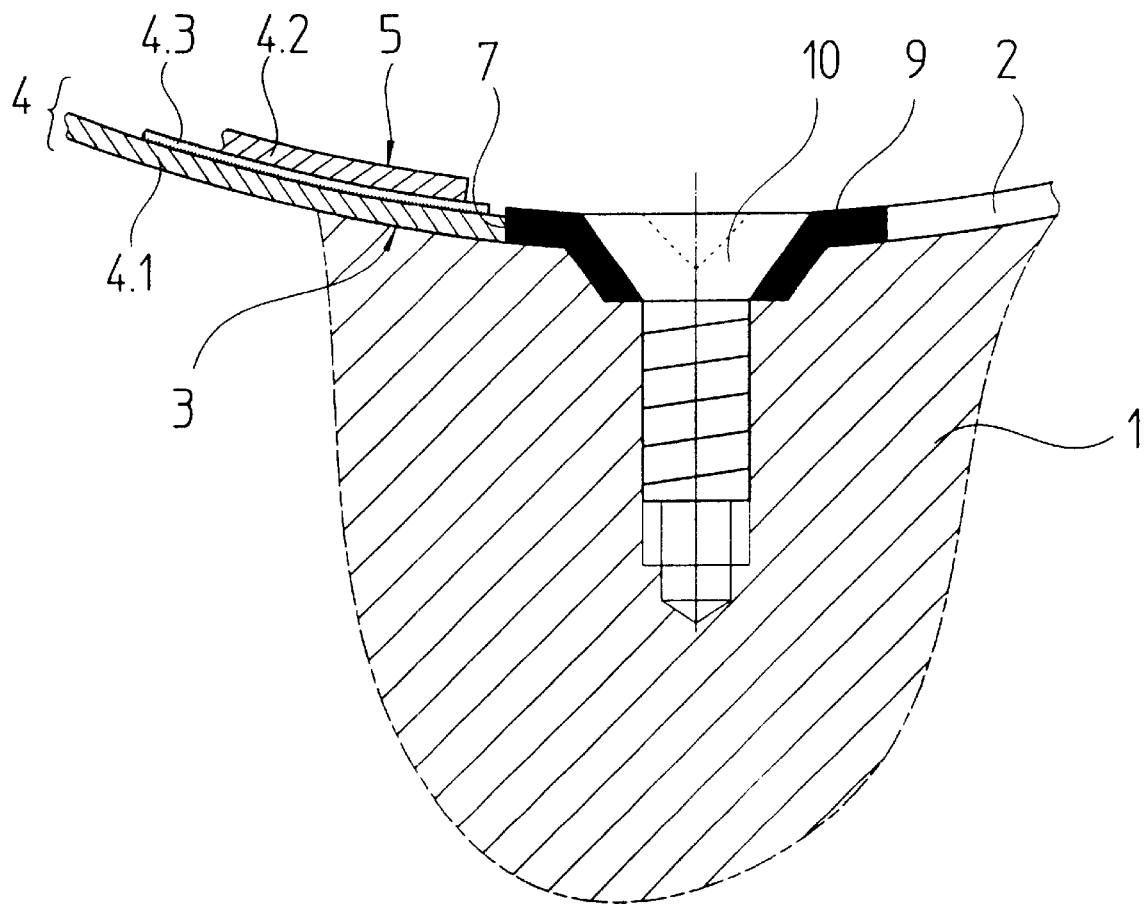
FIG. 6 shows a cross-sectional view of a portion of an inventive angle encoder according to a further embodiment.

In FIG. 6, a portion of another angle encoder according to the invention is shown. The measurement tape 4 is formed as a stack of several stripes 4.1 and 4.2 according to U.S. Pat. No. 5,979,238 incorporated herein by reference thereto, and consists, in particular, of two elastically flexible stripes 4.1 and 4 which adhere to one another via a viscous intermediate, e.g., oil 4.3, with the graduation 5 being provided on the uppermost of the stripes 4.1, 4.2. Such a measurement tape 4 consists of a base stripe 4.1, which can be formed as a steel stripe, and further, the graduation 5-carrying stripe 4.2 bounded to the base stripe 4.1 via an oil film 4.3. With such design, it is possible to bring into contact with the stop surfaces 6,7 only the base stripe 4.1, so that the graduation 5-carrying stripe 4.2 can freely expand in the measurement direction X while despite this, following the course of the bearing surface 3 due to its bonding to the base stripe 4.1. This is because the base stripe 4.1 abuts the bearing surface 3 backlash-free by being shap-fitted between both stop surfaces 6 and 7. To this end, the graduation 5-carrying stripe 4.2 is made somewhat shorter than the base stripe 4.1. To provide a fixed point, the graduation 5-carrying stripe 4.2 can be fixedly secured on the base strip 4.1 at one point.

Though the present invention was shown and described with references to the preferred embodiments such are merely illustrative of the present invention and are not to be construed as a limitation thereof, and various modifications to the present invention will be apparent to those skilled in the art. It is, therefore, not intended that the present invention be limited to the disclosed embodiments or details thereof, and the present invention includes all of variations and/or alternative embodiments within the spirit and scope of the present invention as defined by the appended claims.

What is claimed is:

1. An angle encoder, comprising a carrier member having a concave bearing surface a circumference of which is determined between two, spaced from each other, stop surfaces provided on the bearing surface; a measurement tape securable on the bearing surface circumference by being snap-fitted between the stop surfaces with opposite end surfaces of the measurement tape engaging respective stop surfaces in a mounted position of the measurement tape; and an adjustment element for adjusting a circumferential position of at least one of the stop surfaces so that a distance between the two stop surfaces and thereby a length of the bearing surface circumference correspond to a length of the measurement tape, whereby the measurement tape lays on the bearing surface circumference, in the mounted condition thereof, backlash-free after having been snap-fitted.

2. An angle encoder according to claim 1, wherein the adjustable stop surface is formed by a circumferential surface of the adjustment element which is formed as an eccentrically supported rotational body.

3. An angle encoder according to claim 2, wherein the adjustment element is formed as a disc, and the encoder further comprises a screw for securing the disc in a predetermined rotational position corresponding to a predetermined circumferential position of the adjustable stop surface.

4. An angle encoder according to claim 1, wherein the bearing surface is formed by a bottom of a groove formed in the carrier member and in which the measurement tape is located.

5. An angle encoder according to claim 1, wherein the measurement tape is formed as a steel tape elastically flexibly deflectable in a direction transverse to a longitudinal extent thereof.

6. An angle encoder according to claim 1, wherein the measurement tape is formed of an elastically flexible base strip and a graduation carrying further stripe bonded to the base strip by a viscous intermediate film.

7. An angle encoder according to claim 6, wherein only the base strip has opposite end surfaces thereof engaging the stop surfaces.

\* \* \* \* \*